US012799335B2

(12) United States Patent
Tunnicliffe et al.

(10) Patent No.: US 12,799,335 B2

(45) Date of Patent: Nov. 17, 2026

(54) LOWER SURFACE AREA CARBON BLACK AND ELASTOMERIC COMPOSITIONS COMPRISING SAME

(71) Applicant: BIRLA CARBON U.S.A., INC., Marietta, GA (US)

(72) Inventors: Lewis B. Tunnicliffe, Woodstock, GA (US); Charles R. Herd, Ball Ground, GA (US)

(73) Assignee: BIRLA CARBON U.S.A., INC., Marietta, GA (US)

( * ) Notice: Subject to any disclaimer, the term of this patent is extended or adjusted under 35 U.S.C. 154(b) by 691 days.

(21) Appl. No.: 18/267,604

(22) PCT Filed: Dec. 17, 2021

(86) PCT No.: PCT/US2021/064039

§ 371 (c)(1),
(2) Date: Jun. 15, 2023

(87) PCT Pub. No.: WO2022/133216

PCT Pub. Date: Jun. 23, 2022

(65) Prior Publication Data

US 2024/0052171 A1 Feb. 15, 2024

Related U.S. Application Data

(60) Provisional application No. 63/270,333, filed on Oct. 21, 2021, provisional application No. 63/127,100, filed on Dec. 17, 2020.

(51) Int. Cl.

*C09C 1/48* (2006.01)
*C08K 3/04* (2006.01)

(52) U.S. Cl.

CPC .................. *C09C 1/48* (2013.01); *C08K 3/04* (2013.01); *C01P 2006/12* (2013.01); *C01P 2006/19* (2013.01); *C01P 2006/90* (2013.01); *C08K 2201/006* (2013.01)

(58) Field of Classification Search

None

See application file for complete search history.

(56) References Cited

U.S. PATENT DOCUMENTS

| | | | |
|---|---|---|---|
| 2006/0178467 A1 | 8/2006 | Fukushima et al. | |
| 2011/0124792 A1 | 5/2011 | Froehlich et al. | |
| 2018/0282523 A1 | 10/2018 | Sandstrom | |
| 2020/0036985 A1 | 1/2020 | Jang et al. | |
| 2020/0291237 A1 | 9/2020 | Hardman et al. | |
| 2023/0348728 A1 * | 11/2023 | Westenberg | ............ C09C 1/565 |

FOREIGN PATENT DOCUMENTS

| | | |
|---|---|---|
| DE | 10 2016 204 217 A1 | 9/2016 |
| KR | 2003-0049660 A1 | 6/2003 |
| WO | 2018/195460 A1 | 10/2018 |
| WO | 2020/069098 A1 | 4/2020 |
| WO | 2021/105396 A1 | 6/2021 |
| WO | 2022/042994 A1 | 3/2022 |
| WO | 2022/089907 A1 | 5/2022 |

* cited by examiner

*Primary Examiner* — Robert T Butcher

(74) *Attorney, Agent, or Firm* — Ballard Spahr LLP

(57) ABSTRACT

Carbon black for use in elastomeric compositions, together with methods for the manufacture and use thereof.

12 Claims, 8 Drawing Sheets

LOWER SURFACE AREA CARBON BLACK AND ELASTOMERIC COMPOSITIONS COMPRISING SAME

CROSS-REFERENCE TO RELATED APPLICATIONS

This application is a national phase filing under 35 U.S.C. § 371 of International Application No. PCT/US2021/064039, filed Dec. 17, 2021, which claims priority to U.S. Provisional Application No. 63/127,100, filed Dec. 17, 2020, and U.S. Provisional Application No. 63/270,333, filed Oct. 21, 2021, both of which are incorporated by reference in their entirety.

TECHNICAL FIELD

This disclosure relates to carbon blacks having relatively low surface area, structure, and residue, elastomeric compositions comprising the carbon blacks, and methods for preparing and using the carbon blacks and elastomeric compositions. The elastomeric compositions exhibit improved dispersion, lower hysteresis, improved tear strength, cord adhesion, and fatigue life, among other properties, relative to other carbon blacks.

TECHNICAL BACKGROUND

Carbon blacks have long been used in elastomeric compositions for reinforcement purposes, but improvements are needed in the areas of dispersion, hysteresis, and fatigue life. These needs and other needs are satisfied by the compositions and methods of the present disclosure.

SUMMARY

In accordance with the purpose(s) of the disclosure, as embodied and broadly described herein, this disclosure, in one aspect, relates to carbon black and methods for the manufacture and use thereof.

In one aspect, the inventive carbon black has the following properties: (a) a nitrogen surface area (NSA) ranging from about 50 $m^2/g$ to about 70 $m^2/g$; (b) a statistical thickness surface area (STSA) ranging from about 50 $m^2/g$ to about 70 $m^2/g$; (c) an iodine absorption number ranging from about 50 mg/g to about 65 mg/g; (d) an oil absorption number (OAN) ranging from about 50 cc/100 g to about 85 cc/100 g; and (e) a compressed oil absorption number (COAN) ranging from about 40 cc/100 g to about 85 cc/100 g.

In another aspect, the inventive rubber composition comprises (a) an elastomer in an amount of 100 parts per hundred rubber (phr); and (b) a carbon black in an amount ranging from 35 parts per hundred rubber (phr) to 75 parts per hundred rubber (phr); wherein the carbon black has the following properties: a nitrogen surface area (NSA) ranging from about 50 $m^2/g$ to about 70 $m^2/g$; a statistical thickness surface area (STSA) ranging from about 50 $m^2/g$ to about 70 $m^2/g$; an iodine absorption number ranging from about 50 mg/g to about 65 mg/g; an oil absorption number (OAN) ranging from about 50 cc/100 g to about 85 cc/100 g; and a compressed oil absorption number (COAN) ranging from about 40 cc/100 g to about 85 cc/100 g.

In a further aspect, the method of making the inventive rubber composition comprises: (a) providing an elastomer in an amount of about 100 parts per hundred rubber (phr); (b) providing a carbon black in an amount ranging from 35 parts per hundred rubber (phr) to 75 parts per hundred rubber (phr); and (c) mixing the elastomer and the carbon black to form an elastomeric composition; wherein the carbon black has the following properties: a nitrogen surface area (NSA) ranging from about 50 $m^2/g$ to about 70 $m^2/g$; a statistical thickness surface area (STSA) ranging from about 50 $m^2/g$ to about 70 $m^2/g$; an iodine absorption number ranging from about 50 mg/g to about 65 mg/g; an oil absorption number (OAN) ranging from about 50 cc/100 g to about 85 cc/100 g; and a compressed oil absorption number (COAN) ranging from about 40 cc/100 g to about 85 cc/100 g.

BRIEF DESCRIPTION OF THE DRAWINGS

The foregoing summary, as well as the following description of the disclosure, is better understood when read in conjunction with the appended drawings. For the purpose of illustrating the disclosure, the drawings illustrate some, but not all, alternative embodiments. This disclosure is not limited to the precise arrangements and instrumentalities shown. The following figures, which are incorporated into and constitute part of the specification, assist in explaining the principles of the disclosure.

Figure 1:
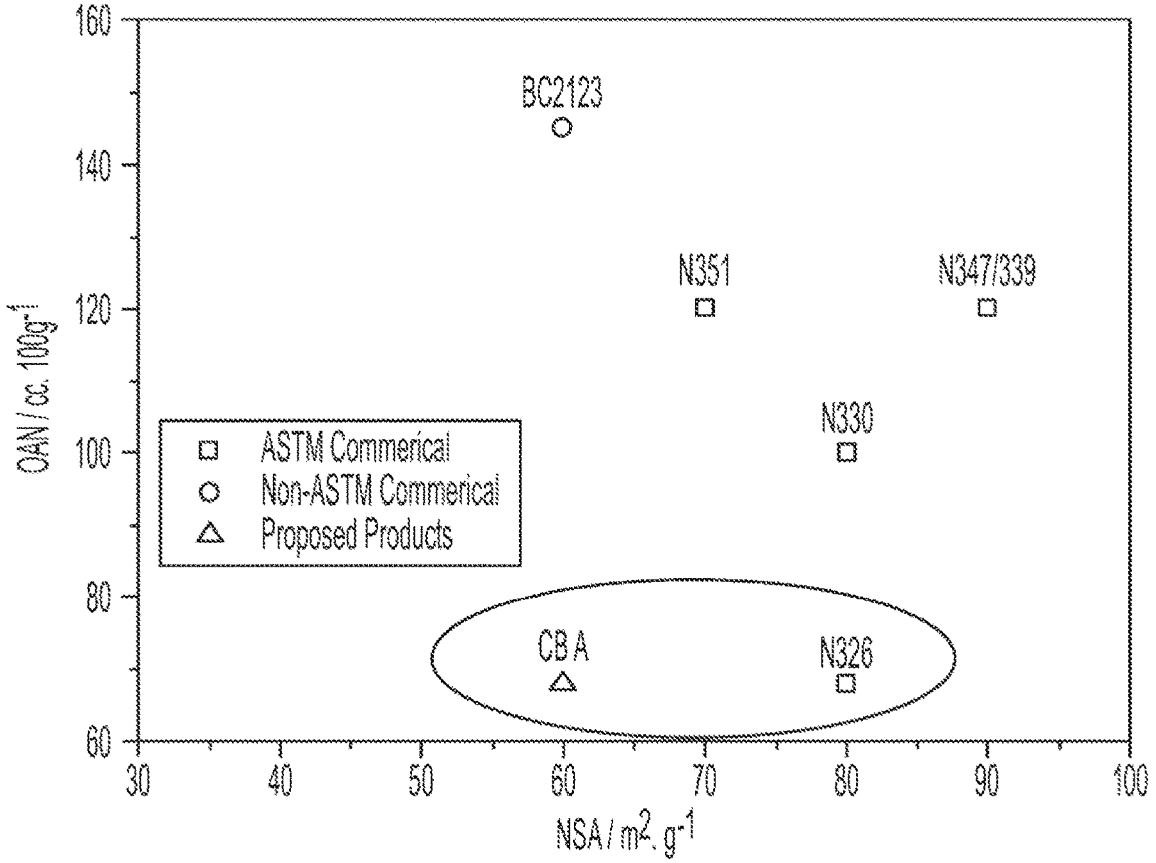
FIG. 1 is a plot of oil absorption number (OAN) and nitrogen surface area (NSA) for an exemplary embodiment of a claimed carbon black (labeled "CB A"), as compared to other ASTM commercial and non-ASTM commercial carbon blacks.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the invention as claimed.

DETAILED DESCRIPTION

The present disclosure can be understood more readily by reference to the following detailed description of the invention and the Examples included therein.

Before the present carbon blacks, compositions, articles, and methods are disclosed and described, it is to be understood that they are not limited to specific synthetic methods unless otherwise specified, or to particular reagents unless otherwise specified, as such can, of course, vary. It is also to be understood that the terminology used is for the purpose of describing particular aspects only and is not intended to be limiting. Although any methods and materials similar or equivalent to those described can be used in the practice or testing of the present disclosure, example methods and materials are now described.

All publications are incorporated herein by reference to disclose and describe the methods and/or materials in connection with which the publications are cited.

A. Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

Unless specifically stated to the contrary, the singular forms "a," "an" and "the" include plural referents unless the context clearly dictates otherwise. Thus, for example, reference to "a carbon black" or "an elastomer" includes mixtures of two or more carbon blacks, or elastomers, respectively.

Ranges can be expressed as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed, and that each value is also disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

When the term "about" precedes a numerical value, the numerical value can vary within ±10% unless specified otherwise.

The terms "optional" or "optionally" means that the subsequently described event or circumstance can or can not occur, and that the description includes instances where said event or circumstance occurs and instances where it does not.

"Nitrogen surface area (NSA)" and "statistical thickness surface area (STSA)" refers to nitrogen surface area and statistical thickness surface area as measured according to ASTM Test Method D6556, which is incorporated by reference.

"Iodine absorption number" refers to iodine absorption values as measured according to ASTM D1510.

"Oil absorption number (OAN)" refers to oil absorption values as measured according to ASTM D2414.

"Compressed oil absorption number (COAN)" refers to compressed oil absorption values as measured according to ASTM D3493.

"325 mesh water wash residue" refers to residue values as measured according to ASTM D1514.

"IFM dispersion index" refers to a dispersion index value as measured according to D2663 (method D).

"Mooney viscosity" refers to a viscosity value as measured according to ASTM D412.

"Tear strength" refers to a tear strength value as measured according to ASTM D624 CP.

"Cord adhesion" refers to a cord adhesion value as measured according to D2229.

"Fatigue life" refers to a fatigue life value (e.g., measured at 65%, 100%, or 135% strain) as measured according to D4482.

All the above-described ASTM methods are incorporated by reference in their entireties.

Unless specifically described otherwise, "phr" is intended to refer to parts per hundred of rubber, as commonly understood and used in the rubber industry.

"Substantially identical reference composition" refers to a composition that is in all respects substantially identical in terms of components of the composition and amount of those components in phr (within ±10%) but with the inventive carbon black replaced with ASTM N326 grade carbon black. In a further aspect, "substantially identical reference composition" refers to a composition that is in all respects substantially identical in terms of components of the composition and amount of those components in phr (within ±5%) but with the inventive carbon black replaced with ASTM N326 grade carbon black. In a further aspect, "substantially identical reference composition" refers to a composition that is in all respects substantially identical in terms of components of the composition and amount of those components in phr (within ±2%) but with the inventive carbon black replaced with ASTM N326 grade carbon black. In a further aspect, "substantially identical reference composition" refers to a composition that is in all respects substantially identical in terms of components of the composition and amount of those components in phr (within ±1%) but with the inventive carbon black replaced with ASTM N326 grade carbon black. In a further aspect, "substantially identical reference composition" refers to a composition that is in all respects identical (within margins of measurement error) in terms of components of the composition and amount of those components in phr but with the inventive carbon black replaced with ASTM N326 grade carbon black.

Disclosed are the components to be used to prepare the compositions of the disclosure as well as the compositions themselves to be used within the methods disclosed. These and other materials are disclosed, and it is understood that when combinations, subsets, interactions, groups, etc. of these materials are disclosed that while specific reference of each various individual and collective combinations and permutation of these compounds can not be explicitly disclosed, each is specifically contemplated and described. For example, if a particular carbon black is disclosed and discussed and a number of modifications that can be made to a number of materials including the carbon blacks are discussed, specifically contemplated is each and every combination and permutation of the carbon black and the modifications that are possible unless specifically indicated to the contrary. Thus, if a class of carbon blacks A, B, and C are disclosed as well as a class of carbon blacks D, E, and F and an example of a combination carbon black, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions. Thus, if there are a variety of additional steps that can be performed it is understood that each of these additional steps can be performed with any specific embodiment or combination of embodiments of the methods.

Each of the materials disclosed are either commercially available and/or the methods for the production thereof are known to those of skill in the art.

It is understood that the compositions disclosed have certain functions. Disclosed are certain structural requirements for performing the disclosed functions, and it is understood that there are a variety of structures that can perform the same function that are related to the disclosed structures, and that these structures will typically achieve the same result.

B. Carbon Blacks

Carbon blacks are often used in belt and ply regions of a tire and other dynamic rubber applications. Because rubber components used in such applications typically undergo fatigue loadings, the rubber compounds should have good fatigue life and crack growth resistance. Traditional ASTM N326 grade carbon black is commonly used to impart good tear strength to such compositions, but this grade of carbon black can be difficult to adequately disperse at factory scale. Poor dispersion characteristics in turn result in reduced fatigue life and increased hysteresis.

ASTM N326 grade carbon black has the following properties: (a) nitrogen surface area (NSA) of 78 $m^2/g$; (b) statistical thickness surface area (STSA) of 76 $m^2/g$; (c) iodine absorption number of 82 mg/g; (d) oil absorption number (OAN) of 72 cc/100 g; and (e) compressed oil absorption number (COAN) of 68 cc/100 g, as described in ASTM D1765. Surface area (NSA) values and structure (OAN or COAN) values for ASTM N326 grade carbon black differ by more than 11%. Without wishing to be bound by theory, it is believed that this divergence is in part responsible for poor dispersion characteristics, which in turn lead to other negative impacts on mechanical properties.

As shown in FIG. 1, an exemplary embodiment of the inventive carbon black, by contrast, has surface area values and structural values (OAN, for example) that are not as different than those exhibited by ASTM N326 grade carbon black. Thus, in various aspects, the carbon black can be described in terms of the percent difference in various surface area and structural values.

In one aspect, embodiments of the inventive carbon blacks exhibit a difference between NSA and OAN or COAN of no more than 11%, e.g., no more than 10%, no more than 9%, no more than 8%, no more than 7%, no more than 6%, no more than 5%, no more than 4%, no more than 3%, no more than 2%, or no more than 1%. In a further aspect, embodiments of the inventive carbon blacks exhibit no measurable difference (within margins of errors) between NSA and OAN or COAN.

In a further aspect, embodiments of the inventive carbon blacks exhibit a difference between statistical thickness surface area (STSA) and OAN or COAN of no more than 11%, e.g., no more than 10%, no more than 9%, no more than 8%, no more than 7%, no more than 6%, no more than 5%, no more than 4%, no more than 3%, no more than 2%, or no more than 1%. In a further aspect, embodiments of the inventive carbon blacks exhibit no measurable difference (within margins of errors) between STSA and OAN or COAN.

Embodiments of the inventive carbon blacks can also be described in terms of difference between different surface area values, namely NSA, STSA, and iodine absorption number. In one aspect, the inventive carbon blacks exhibit a difference between NSA and STSA of no more than 18%, e.g., no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%. In a further aspect, embodiments of the inventive carbon blacks exhibit no measurable difference (within margins of errors) between NSA and STSA.

In a further aspect, the inventive carbon blacks exhibit a difference between NSA or STSA and iodine absorption number of no more than 18%, e.g., no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%. In a further aspect, embodiments of the inventive carbon blacks exhibit no measurable difference (within margins of errors) between NSA or STSA and iodine ab sorption number.

In a still further aspect, the greatest difference between any two of NSA, STSA and iodine absorption number, exhibited by embodiments of the inventive carbon blacks, is no more than 18%, e.g., no more than 18%, no more than 17%, no more than 16%, no more than 15%, no more than 14%, no more than 13%, no more than 12%, no more than 11%, no more than 10%, no more than 9%, no more than 8%, no more than 7%, no more than 6%, no more than 5%, no more than 4%, no more than 3%, no more than 2%, or no more than 1%. In a further aspect, the inventive carbon blacks exhibit no measurable difference (within margins of errors) between NSA, STSA, and iodine absorption number.

In one aspect, exemplary embodiments of the inventive carbon black can have a nitrogen surface area (NSA) ranging from about 50 $m^2/g$ to about 70 $m^2/g$. In a further aspect, exemplary embodiments of the inventive carbon black can have a nitrogen surface area (NSA) ranging from about 55 $m^2/g$ to about 65 $m^2/g$. In another aspect, the inventive carbon black can have a nitrogen surface area (NSA) of about 57.1 $m^2/g$, or from about 52 to about 62 $m^2/g$, or from about 55 to about 59 $m^2/g$.

In a further aspect, exemplary embodiments of the inventive carbon black can have a statistical thickness surface area (STSA) ranging from about 50 $m^2/g$ to about 70 $m^2/g$. In one aspect, exemplary embodiments of the inventive carbon black can have a statistical thickness surface area (STSA) ranging from about 55 $m^2/g$ to about 65 $m^2/g$. In another aspect, the inventive carbon black can have a statistical thickness surface area (STSA) of about 57.3 $m^2/g$, or from about 52 to about 62 $m^2/g$, or from about 55 to about 59 $m^2/g$.

In one aspect, exemplary embodiments of the inventive carbon black can have an iodine absorption number ranging from about 50 mg/g to about 65 mg/g. In a further aspect, exemplary embodiments of the inventive carbon black can have an iodine absorption number ranging from about 55 mg/g to about 65 mg/g. In another aspect, the inventive carbon black can have an iodine absorption number of about 64.1 or from about 60 to about 70, or from about 62 to about 66 mg/g.

In one aspect, exemplary embodiments of the inventive carbon black can have an oil absorption number (OAN) ranging from about 50 cc/100 g to about 85 cc/100 g. In another aspect, exemplary embodiments of the inventive carbon black can have an oil absorption number (OAN) ranging from about 65 cc/100 g to about 75 cc/100 g. In another aspect, the inventive carbon black can have an oil absorption number of about 75.2 cc/100 g, or from about 65 to about 85, from about 70 to about 80, or from about 73 to about 77 cc/100 g.

In one aspect, exemplary embodiments of the inventive carbon black can have a compressed oil absorption number (COAN) ranging from about 40 cc/100 g to about 85 cc/100 g. In a further aspect, exemplary embodiments of the inventive carbon black can have a compressed oil absorption number (COAN) ranging from about 65 cc/100 g to about 75 cc/100 g. In another aspect, the inventive carbon black can have a compressed oil absorption number of about 70.7 cc/100 g, from about 60 to about 80, from about 65 to about 75, or from about 68 to about 73 cc/100 g.

In one aspect, exemplary embodiments of the inventive carbon black can have a 325 mesh water wash residue of less than about 125 ppm, e.g., from 0-124 ppm. In a further aspect, exemplary embodiments of the inventive carbon black can have a 325 mesh water wash residue of less than about 100 ppm, e.g., 0-99 ppm. In another aspect, the inventive carbon black can have a 325 mesh water wash residue of about 50 ppm, or from about 1 to about 49 ppm, from about 0 to about 20 ppm, from about 8 to about 16 ppm, or less than about 15 ppm. In another aspect, the inventive carbon black can have a 325 mesh water wash residue of about 25 ppm, or from about 1 to about 24 ppm, from about 0 to about 20 ppm, from about 8 to about 16 ppm, or less than about 15 ppm.

In another aspect, the inventive carbon black can have a 325 mesh water wash residue of about 12 ppm, or from about 1 to about 30 ppm, from about 0 to about 20 ppm, from about 8 to about 16 ppm, or less than about 15 ppm.

In another aspect, the inventive carbon black can have an ash content of about 0.11%, or from about 0.01 to about 0.4%, from about 0.03 to about 0.25%, or less than about 0.2%, or less than about 0.15%.

In a further aspect, the inventive carbon black can have a tint of about 87.7% ITRB, from about 80 to about 95, from about 84 to about 92, or from about 86 to about 90% ITRB. In another aspect, the inventive carbon black can have a transmission of about 99.4%, from about 98 to 100, from about 98.5 to 100, from about 99 to 100, or from about 99 to about 99.9%.

In a further aspect, the inventive carbon black can have a pH of about 9.8, or from about 8.5 to about 11, from about 9 to about 11, or from about 9.4 to about 10.2. In another aspect, the inventive carbon black can have a Sulphur content of about 1.21%, from about 0.8 to about 1.6%, from about 1 to about 1.4%, less than about 1.5%, or less than about 1.3%.

In a further aspect, exemplary embodiments of the inventive carbon blacks can have a primary particle size and/or surface area between that of the ASTM N300 and ASTM N500 series carbon blacks.

In another aspect, the inventive carbon black can be used in belt and ply regions of a tire. As these tire components typically undergo fatigue loadings, the rubber compounds used in these components require good fatigue life and crack growth resistance. Traditional ASTM N326 grade carbon black can impart good tear strength to such components, but can result in difficulties with dispersion at factory scale. Such poor dispersion can result in reduced fatigue life and increased hysteresis.

In various aspects, the inventive carbon black can have a coarser particle size at iso-structure vs. an ASTM N326 grade carbon black.

In one specific aspect, an exemplary embodiment of the inventive carbon black has the following properties: (a) a nitrogen surface area (NSA) ranging from about 55 $m^2/g$ to about 65 $m^2/g$; (b) a statistical thickness surface area (STSA) ranging from about 55 $m^2/g$ to about 65 $m^2/g$; (c) an iodine absorption number ranging from about 55 mg/g to about 65 mg/g; (d) an oil absorption number (OAN) ranging from about 65 cc/100 g to about 75 cc/100 g; (e) a compressed oil absorption number (COAN) ranging from about 65 cc/100 g to about 75 cc/100 g; and (f) a 325 mesh water wash residue of less than about 100 ppm, e.g., less than about 50 ppm, less than about 40 ppm, less than about 30 ppm, less than about 20 ppm, less than about 15 ppm, or less than about 10 ppm.

In various aspects, the inventive carbon black exhibits exceptional in-rubber performance vs. a conventional ASTM N326 grade carbon black, including improved dispersibility, reduced hysteresis (15-20%) at equal dynamic stiffness, and extended fatigue life (up to 2× or more). In various aspects, such benefits can be attributed to increased particle size, resulting in reduced filler networking and a reduction in the number of undispersed carbon black crack precursors.

Thus, in various aspects, the inventive carbon black exhibits lower surface area than N326 allowing better dispersion, lower hysteresis, and longer fatigue life. In other aspects, the inventive carbon black has a low residue. In other aspects, the inventive carbon black can have 15-20% lower tan(delta) and/or improved fatigue life vs. an ASTM N326 grade carbon black.

C. Elastomeric Compositions

Another aspect of this disclosure relates to elastomeric (e.g., rubber) compositions comprising the inventive carbon blacks. In general the rubber compositions can comprise at least one elastomer and any inventive carbon black as described above.

In one aspect, the rubber composition comprises: an elastomer in an amount of 100 parts per hundred rubber (phr); and a carbon black in an amount ranging from 35 parts per hundred rubber (phr) to 75 parts per hundred rubber (phr); wherein the carbon black has the following properties: a nitrogen surface area (NSA) ranging from about 50 $m^2/g$ to about 70 $m^2/g$; a statistical thickness surface area (STSA) ranging from about 50 $m^2/g$ to about 70 $m^2/g$; an iodine absorption number ranging from about 50 mg/g to about 65 mg/g; an oil absorption number (OAN) ranging from about 50 cc/100 g to about 85 cc/100 g; and a compressed oil absorption number (COAN) ranging from about 40 cc/100 g to about 85 cc/100 g.

In a further aspect, the carbon black in the rubber composition in an amount ranging from 35 parts per hundred rubber (phr) to 75 parts per hundred rubber (phr) has a 325 mesh water wash residue of less than about 100 ppm. In a further aspect, the carbon black in the rubber composition in an amount ranging from 35 parts per hundred rubber (phr) to 75 parts per hundred rubber (phr) has a 325 mesh water wash residue of less than about 25 ppm.

In one aspect, the carbon black in the rubber composition in an amount ranging from 35 parts per hundred rubber (phr) to 75 parts per hundred rubber (phr) has a nitrogen surface area (NSA) ranging from about 55 $m^2/g$ to about 65 $m^2/g$. In a further aspect, the carbon black in the rubber composition in an amount ranging from 35 parts per hundred rubber (phr) to 75 parts per hundred rubber (phr) has a statistical thickness surface area (STSA) ranging from about 55 $m^2/g$ to about 65 $m^2/g$. In a still further aspect, the carbon black in the rubber composition in an amount ranging from 35 parts per hundred rubber (phr) to 75 parts per hundred rubber (phr) has an iodine absorption number ranging from about 55 mg/g to about 65 mg/g.

In one aspect, the carbon black in the rubber composition in an amount ranging from 35 parts per hundred rubber (phr) to 75 parts per hundred rubber (phr) has a an oil absorption number (OAN) ranging from about 65 cc/100 g to about 75 cc/100 g. In a further aspect, the carbon black in the rubber composition in an amount ranging from 35 parts per hundred rubber (phr) to 75 parts per hundred rubber (phr) has a compressed oil absorption number (COAN) ranging from about 65 cc/100 g to about 75 cc/100 g.

In one specific aspect, the carbon black in the rubber composition in an amount ranging from 35 parts per hundred rubber (phr) to 75 parts per hundred rubber (phr) has the following properties: (a) a nitrogen surface area (NSA) ranging from about 55 $m^2/g$ to about 65 $m^2/g$; (b) a statistical thickness surface area (STSA) ranging from about 55 $m^2/g$ to about 65 $m^2/g$; (c) an iodine absorption number ranging from about 55 mg/g to about 65 mg/g; (d) an oil absorption number (OAN) ranging from about 65 cc/100 g to about 75 cc/100 g; (e) a compressed oil absorption number (COAN) ranging from about 65 cc/100 g to about 75 cc/100 g; and (f) a 325 mesh water wash residue of less than about 100 ppm, e.g., less than 10 ppm.

Any suitable elastomer can be present in the rubber composition. Non-limiting examples include natural rubber (NR), polybutadiene rubber (BR), styrene butadiene rubber (SBR), synthetic polyisoprene rubber, butyl rubber, ethylene propylene rubber, or any blend or combination thereof. Any of the foregoing elastomers can be present in the rubber combination either alone or in combination in an amount of 100 parts per hundred rubber (phr). In a further aspect, the elastomer comprises natural rubber (NR), polybutadiene rubber (BR), or any blend or combination thereof. In a still further aspect, the elastomer comprises natural rubber (NR) in an amount ranging from 40 to 100 parts per hundred rubber (phr) and polybutadiene rubber (BR) in an amount ranging from 0 to 60 parts per hundred rubber (phr). In another aspect, the elastomer comprises natural rubber (NR) in an amount ranging from 40 to 50 parts per hundred rubber (phr) and polybutadiene rubber (BR) in an amount ranging from 50 to 60 parts per hundred rubber (phr). In a further aspect, the elastomer comprises natural rubber (NR) in an amount of 50 parts per hundred rubber (phr) and polybutadiene rubber (BR) in an amount ranging of 50 parts per hundred rubber (phr).

In one aspect, the rubber composition exhibits equal or better properties than a substantially identical reference composition but with the carbon black replaced with ASTM N326 grade carbon black. In one aspect, the inventive composition exhibits an IFM dispersion index that is at least 5% higher than that exhibited by a substantially identical reference composition but with the carbon black replaced with ASTM N326 grade carbon black, e.g., 5% to 60% higher than that exhibited by the substantially identical reference composition, such as for example 5%, 10%, 15%, 20%, 25%, 30%, 35%, 40%, 50%, 57%, 58%, or 60% higher than that exhibited by the substantially identical reference composition. In a further aspect, the inventive composition exhibits an IFM dispersion index that ranges from 5% higher to 60% higher than that exhibited by the substantially identical reference composition.

In one aspect, the inventive composition exhibits a Mooney viscosity value that differs less than 10% of a Mooney viscosity value exhibited by a substantially identical reference composition but with the carbon black replaced with ASTM N326 grade carbon black, e.g., a 0-9.5% variation such as for example, less than 9%, less than 8%, less than 7%, less than 6%, less than 5%, less than 4%, less than 3%, less than 2%, less than 1%, or equal to a Mooney viscosity value exhibited by the substantially identical reference composition.

In one aspect, the inventive composition exhibits a Shore A hardness value that differs less than 5% of a Shore A hardness value exhibited by a substantially identical reference composition but with the carbon black replaced with ASTM N326 grade carbon black, e.g., 0-4.5% variation such as for example less than 4%, less than 3%, less than 2%, less than 1%, or equal to the Shore A hardness value exhibited by the substantially identical reference composition.

In one aspect, the inventive composition exhibits a modulus measured at 100% to 300% tensile strength that differs less than 5% of a modulus measured at 100% to 300% tensile strength exhibited by a substantially identical reference composition but with the carbon black replaced with ASTM N326 grade carbon black, e.g., 0-4.5% variation such as for example less than 4%, less than 3%, less than 2%, less than 1%, or equal to the modulus measured at 100% to 300% tensile strength exhibited by the substantially identical reference composition. In a further aspect, the inventive composition exhibits a tensile strength that differs less than 5% of a tensile strength exhibited by a substantially identical reference composition but with the carbon black replaced with ASTM N326 grade carbon black, e.g., 0-4.5% variation such as for example less than 4%, less than 3%, less than 2%, less than 1%, or equal to the tensile strength exhibited by the substantially identical reference composition.

In one aspect, the composition exhibits elongation at break that differs less than 5% of elongation at break exhibited by a substantially identical reference composition but with the carbon black replaced with ASTM N326 grade carbon black, e.g., 0-4.5% variation such as for example less than 4%, less than 3%, less than 2%, less than 1%, or equal to the elongation at break exhibited by the substantially identical reference composition.

In a further aspect, the inventive composition exhibits a hysteresis indicator value that is at least 10% less than a hysteresis indicator value exhibited by a substantially identical reference composition but with the carbon black replaced with ASTM N326 grade carbon black, e.g., 10% to 50% less, e.g., 10%, 15%, or 20% less than the hysteresis indicator value exhibited by the substantially identical reference composition. In a further aspect, the inventive composition exhibits a hysteresis indicator value that is from 10% less to 20% less than a hysteresis indicator value exhibited by the substantially identical reference composition.

In one aspect, the inventive composition exhibits a tear strength value that is equal to or up to 40% greater than a tear strength value exhibited by a substantially identical reference composition but with the carbon black replaced with ASTM N326 grade carbon black. In a further aspect, the inventive composition exhibits a cord adhesion value that is equal to or up to 60% greater than a cord adhesion value exhibited by a substantially identical reference composition but with the carbon black replaced with ASTM N326 grade carbon black. In a still further aspect, the composition exhibits a fatigue life value that is equal to or up to 60% greater than a fatigue life value exhibited by a substantially identical reference composition but with the carbon black replaced with ASTM N326 grade carbon black.

Also disclosed are articles comprising any inventive rubber composition. Non-limiting examples include any rubber used in a dynamic environment such as tires, rotating belts, among others.

D. Methods

Also described are methods of making the inventive rubber compositions. In one aspect, the method comprises: (a) providing an elastomer in an amount of about 100 parts per hundred rubber (phr); (b) providing a carbon black in an amount ranging from 35 parts per hundred rubber (phr) to 75 parts per hundred rubber (phr); and (c) mixing the elastomer and the carbon black to form an elastomeric composition; wherein the carbon black has the following properties: a nitrogen surface area (NSA) ranging from about 50 $m^2/g$ to about 70 $m^2/g$; a statistical thickness surface area (STSA) ranging from about 50 $m^2/g$ to about 70 $m^2/g$; an iodine absorption number ranging from about 50 mg/g to about 65 mg/g; an oil absorption number (OAN) ranging from about 50 cc/100 g to about 85 cc/100 g; and a compressed oil absorption number (COAN) ranging from about 40 cc/100 g to about 85 cc/100 g. In a further aspect, the carbon black used in the method and/or the rubber composition prepared according to the method can have any or all properties and characteristics as described above.

It is understood that the elastomers utilized in the disclosed method can comprise any elastomer described above. It is further understood that these elastomers can be present in any amounts as described herein to provide for the rubber composition exhibiting the disclosed properties. Similarly any oxidized carbon blacks described herein can be used in any disclosed amounts to prepare the rubber composition exhibiting the disclosed properties.

It is further understood that any types of mixing can be utilized to prepare the inventive rubber composition. In certain aspects, the step of mixing comprises a reactive mixing. In yet other aspects, the step of mixing comprises a conventional step of mixing of ingredients. In still further aspects, the step of mixing comprises blending. In certain aspects, the step of mixing results in homogeneous compositions.

It is understood that the rubber compositions obtained by the methods of the current disclosure can exhibit any or all of the above disclosed properties. In still further aspects, described herein are articles that can be prepared from the rubber composition made by the inventive methods.

E. Examples

The following examples further illustrate this disclosure. The scope of the disclosure and claims is not limited by the scope of the following examples.

One example of an embodiment of the inventive carbon black (labeled "CB A") is described below in Table 1, as compared to N326 grade carbon blacks and Raven L carbon black.

TABLE 1

| | Units | N326 ASTM D1765 | N326 | Raven L | CB A |
|---|---|---|---|---|---|
| Iodine # | mg/g | 82 | 81.2 | 80.7 | 64.1 |
| NSA | $m^2/g$ | 78 | 81.4 | 75.8 | 57.1 |
| STSA | $m^2/g$ | 76 | 81.9 | 76.7 | 57.3 |
| OAN | $m^2/g$ | 72 | 68.7 | 70 | 75.2 |
| COAN | cc/100 g | 68 | 69.1 | 70.8 | 70.7 |
| #325 residue | ppm | max 100 | 132 | 8 | 12 |

An exemplary embodiment of an inventive rubber composition can be prepared according to the loading and method parameters shown in Tables 2-3.

TABLE 2

| Material | Loading/phr |
|---|---|
| NR SMR CV60 | 100 |
| N326 | 50 |
| Zinc Oxide | 5 |
| Stearic Acid | 3 |
| Sulfur (RM-90) | 2.5 |
| TBBS | 0.6 |

1.6 liter Banbury laboratory mixer

Tangential blades.

TABLE 3

| | sec | rpm | Step |
|---|---|---|---|
| 1st Stage, Banbury: | — | 60 | Load: Polymer |
| 70° C., 60 rpm, | 60 | 60 | Ram Down Mixing |
| 3.0 bar | — | 60 | Load: Stearic Acid |
| | 60 | 60 | Ram Down Mixing |
| | — | 60 | Load: ½ CB and Zinc Oxide (blended), Sweep |
| | 90 | 60 | Ram Down Mixing |
| | — | 60 | Load: ½ CB, Sweep |
| | 90 | 60 | Ram Down Mixing (150 C. MAX, reduce RPM as necessary) |
| | ~300 | 60 | Discharge |
| 2nd Stage, Banbury: | — | 60 | Load: ½ MB, Cures. ½ MB |
| 70° C., 30 rpm, | 60 | 30 | Ram Down Mixing |
| 3.0 bar (Make sure | 60 | 30 | Ram Down Mixing |
| MB weight is correct) | — | 30 | Sweep |
| | 120 | 30 | Ram Down Mixing (100° C. Max, Adjust RPM as necessary) |
| | ~240 | 60 | Discharge |

Figure 2:
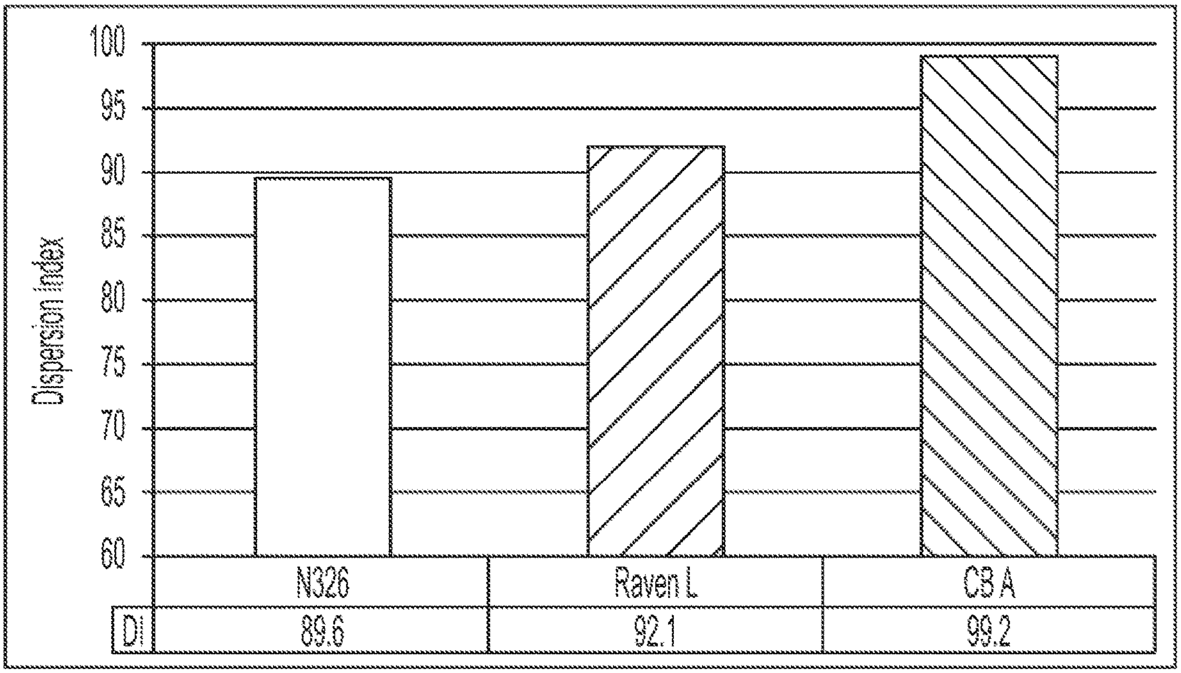
FIG. 2 shows IFM dispersion of an exemplary embodiment of the inventive carbon blacks (labeled "CB A") in an elastomeric composition, as compared to N326 grade and Raven L carbon blacks.
Figure 3:
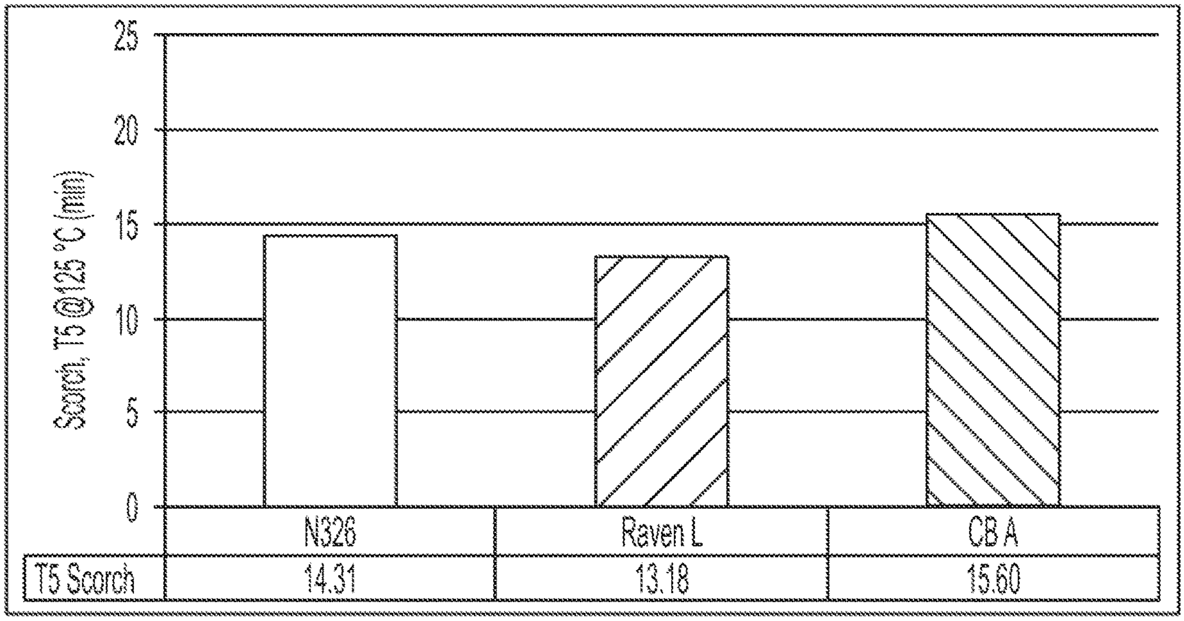
FIG. 3 shows T5 Scorch properties of an exemplary embodiment of the inventive carbon blacks (labeled "CB A") in an elastomeric composition, as compared to N326 grade and Raven L carbon blacks.
Figure 4:
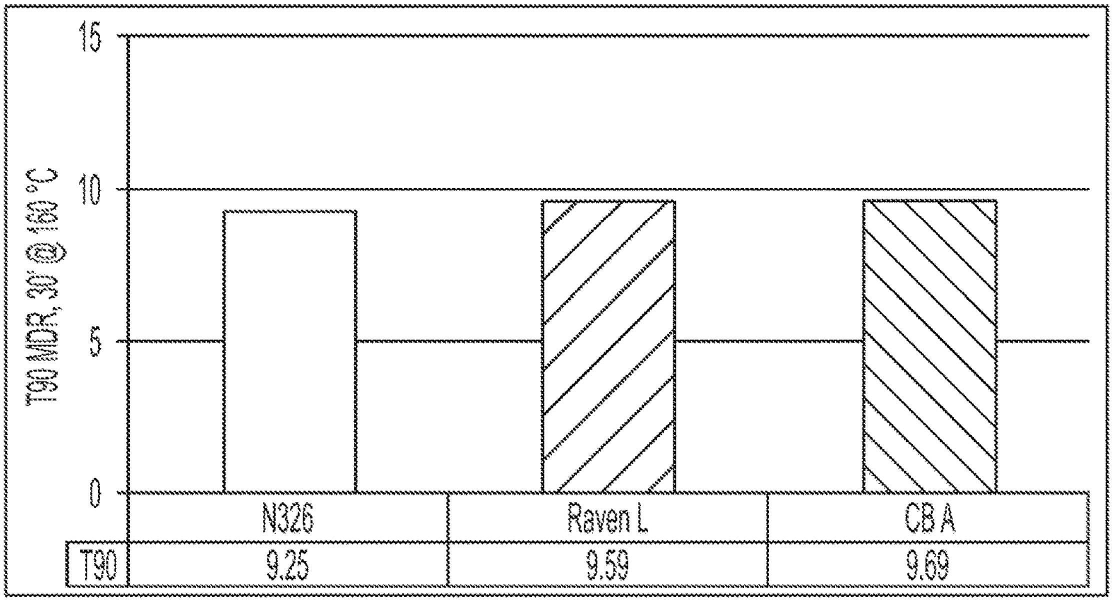
FIG. 4 shows T90 Scorch properties of an exemplary embodiment of the inventive carbon blacks (labeled "CB A") in an elastomeric composition, as compared to N326 grade and Raven L carbon blacks.
Figure 5:
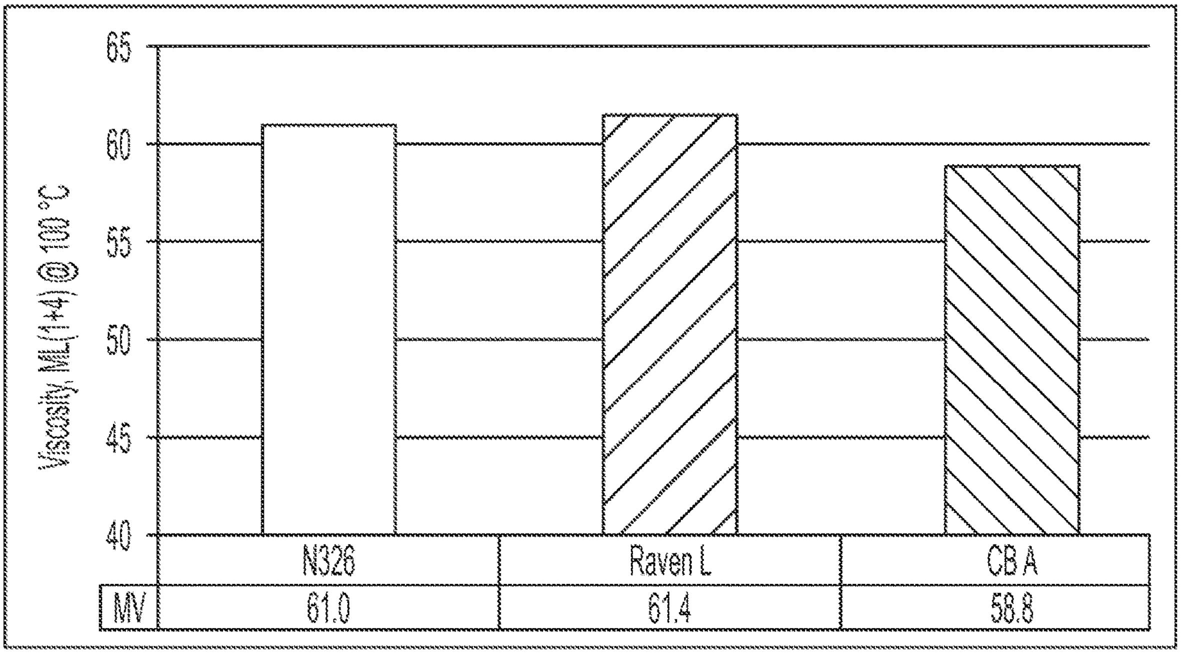
FIG. 5 shows Mooney viscosity properties of an exemplary embodiment of the inventive carbon blacks (labeled "CB A") in an elastomeric composition, as compared to N326 grade and Raven L carbon blacks.
Figure 6:
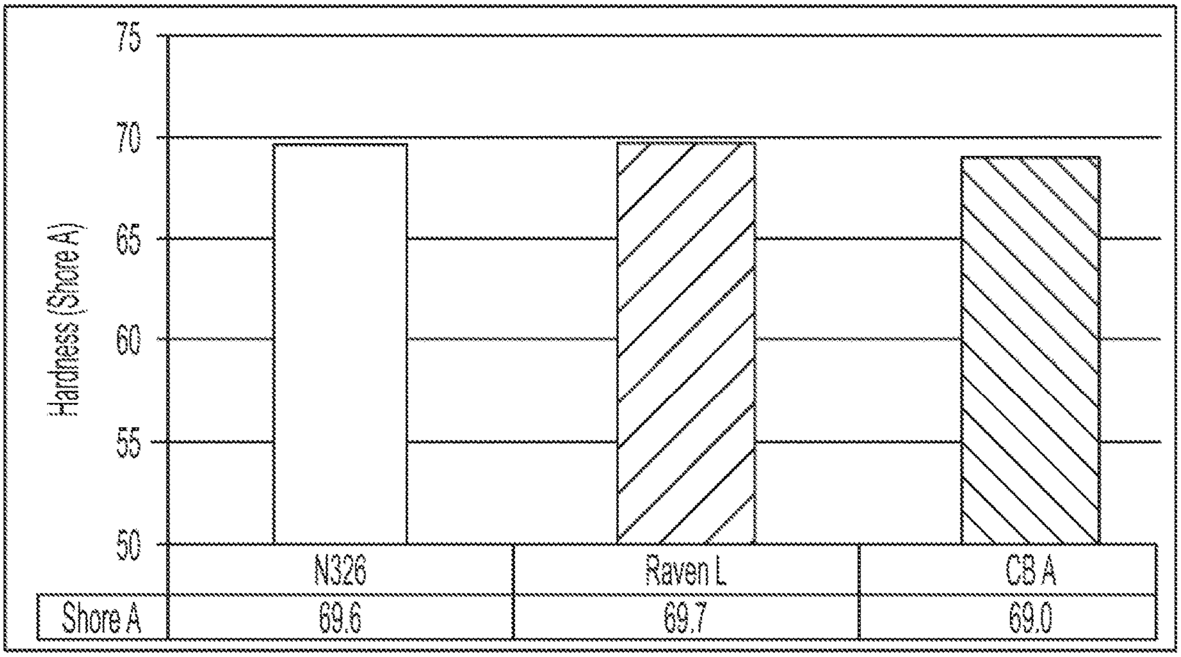
FIG. 6 shows Shore A Hardness of an exemplary embodiment of the inventive carbon blacks (labeled "CB A") in an elastomeric composition, as compared to N326 grade and Raven L carbon blacks.
Figure 7:
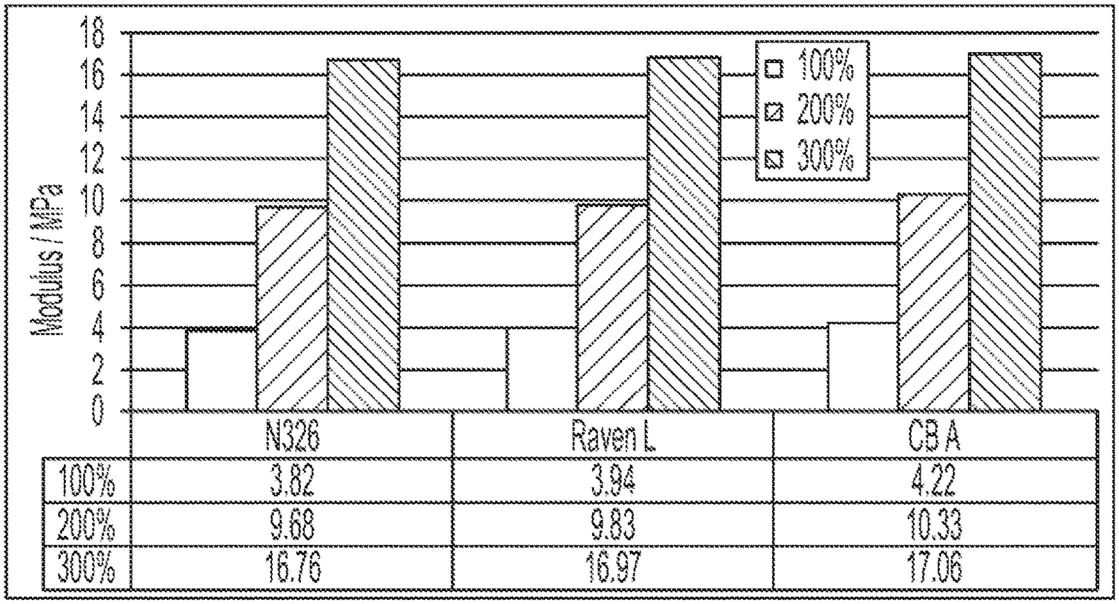
FIG. 7 shows static moduli of an exemplary embodiment of the inventive carbon blacks (labeled "CB A") in an elastomeric composition, as compared to N326 grade and Raven L carbon blacks (bars for each sample as L-R, 100%, 200%, 300%).
Figure 8:
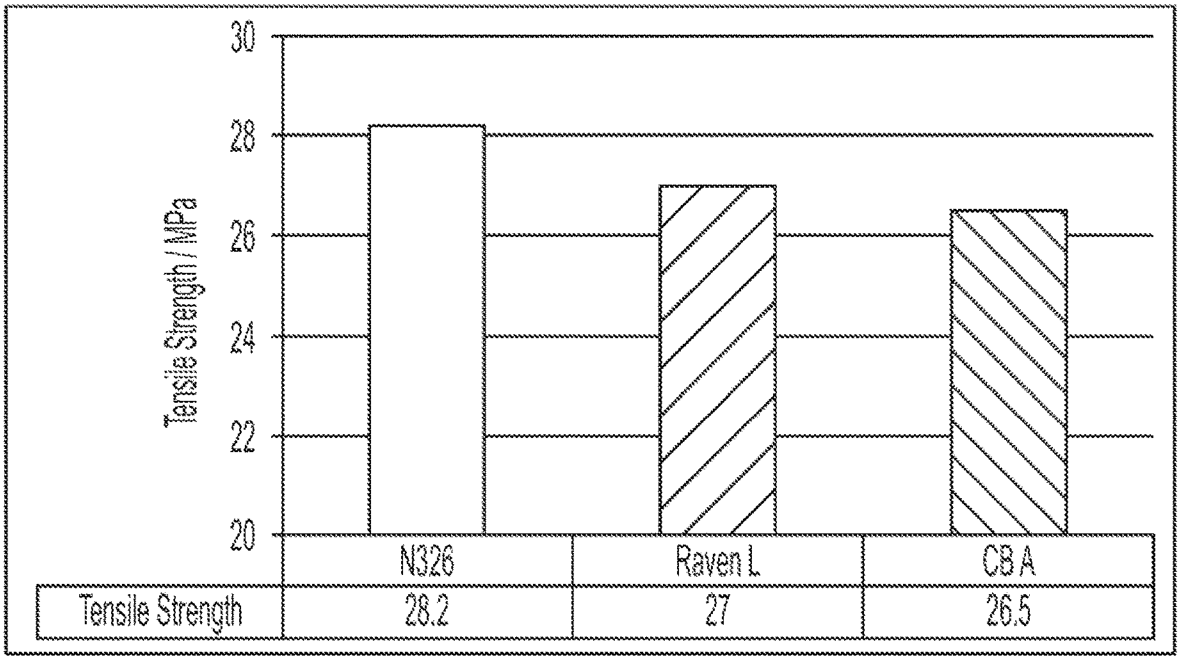
FIG. 8 shows tensile strength of an exemplary embodiment of the inventive carbon blacks (labeled "CB A") in an elastomeric composition, as compared to N326 grade and Raven L carbon blacks.
Figure 9:
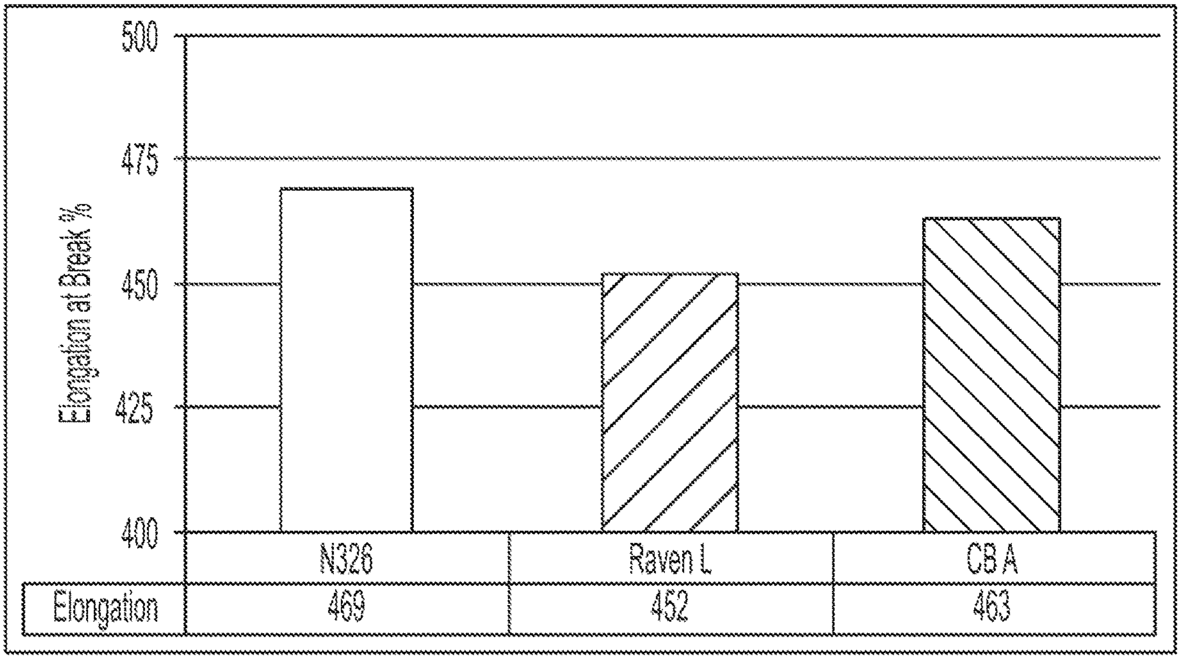
FIG. 9 shows elongation at break % of an exemplary embodiment of the inventive carbon blacks (labeled "CB A") in an elastomeric composition, as compared to N326 grade and Raven L carbon blacks.
Figure 10:
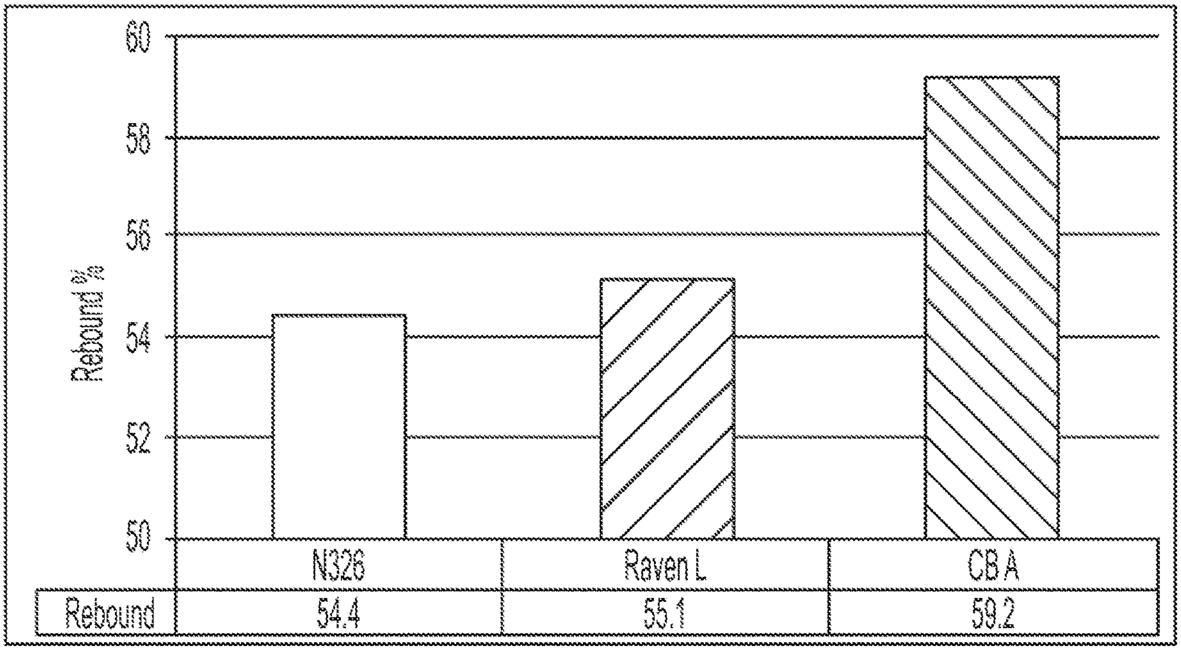
FIG. 10 shows rebound at 25° C. of an exemplary embodiment of the inventive carbon blacks (labeled "CB A") in an elastomeric composition, as compared to N326 grade and Raven L carbon blacks.
Figure 11:
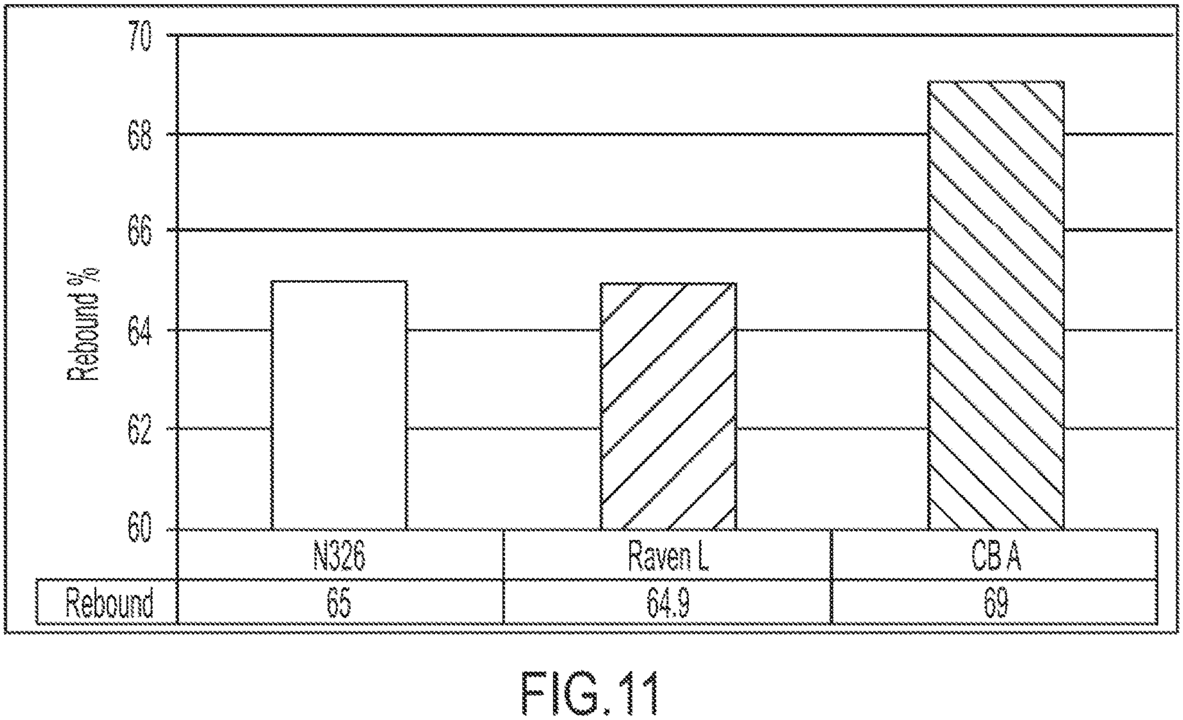
FIG. 11 shows rebound at 60° C. of an exemplary embodiment of the inventive carbon blacks (labeled "CB A") in an elastomeric composition, as compared to N326 grade and Raven L carbon blacks.
Figure 12:
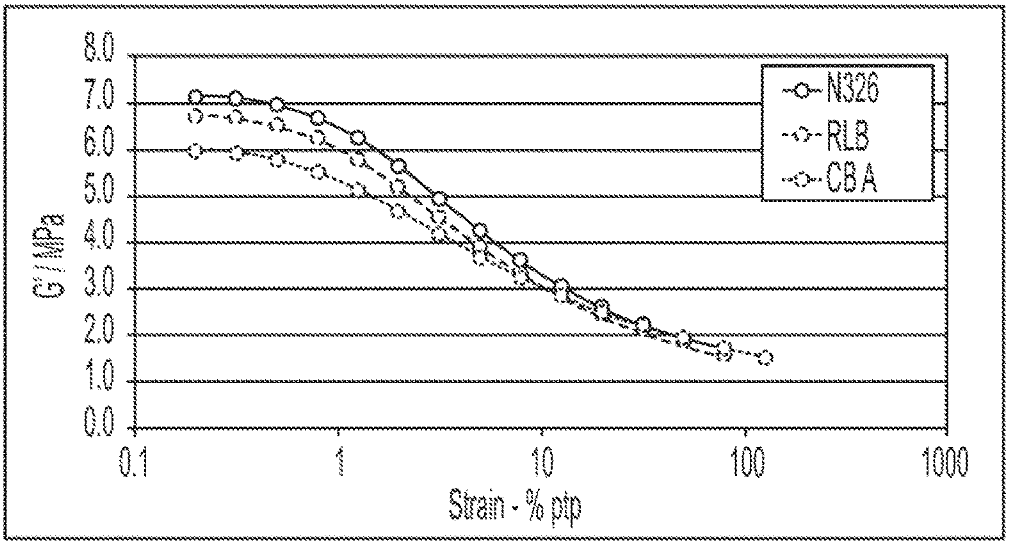
FIG. 12 shows ARES dynamic data from an exemplary embodiment of the inventive carbon blacks (labeled "CB A") in an elastomeric composition, as compared to N326 grade and Raven L carbon blacks.
Figure 13:
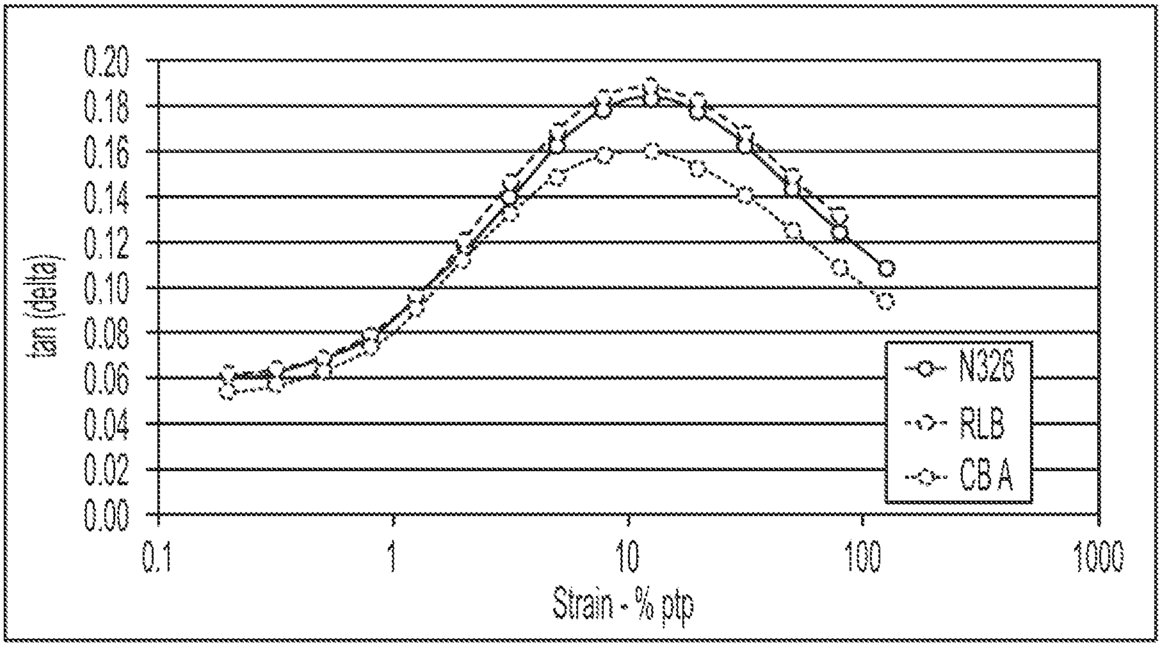
FIG. 13 shows ARES dynamic data from an exemplary embodiment of the inventive carbon blacks (labeled "CB A") in an elastomeric composition, as compared to N326 grade and Raven L carbon blacks, showing a 15-20% reduction in compound tan(delta) max versus the N326 control.
Figure 14A:
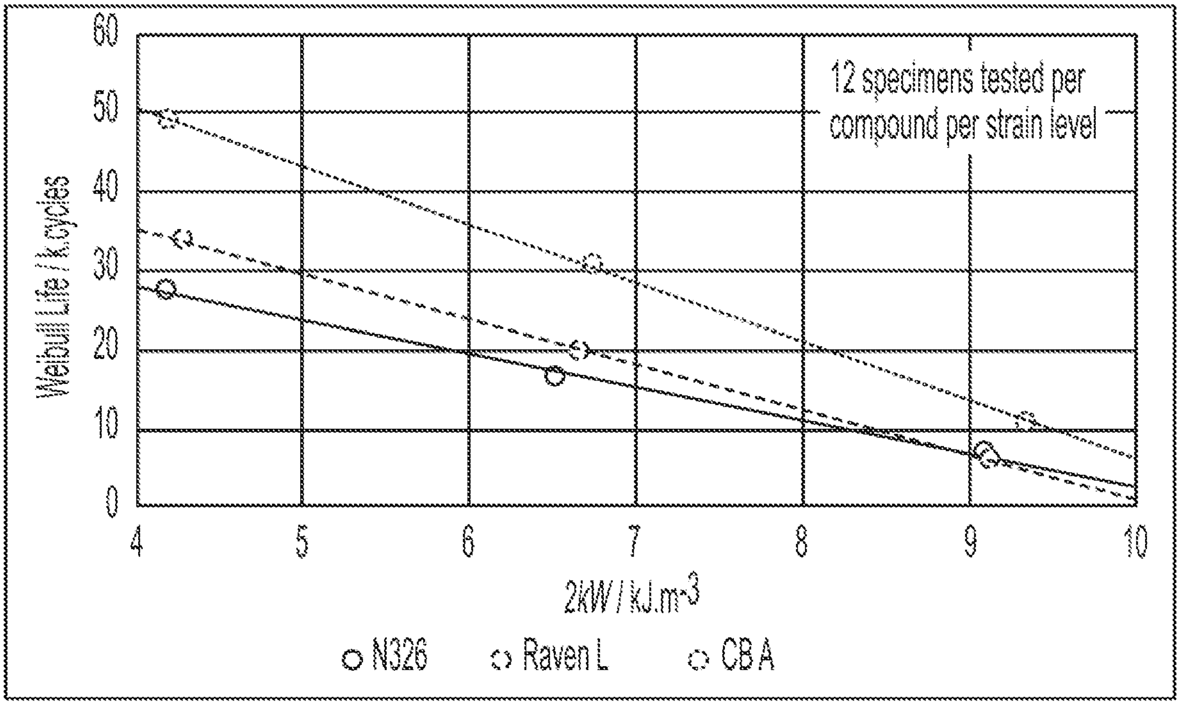
FIG. 14A shows tensile fatigue life of an exemplary embodiment of the inventive carbon blacks in an elastomeric composition.
Figure 14B:
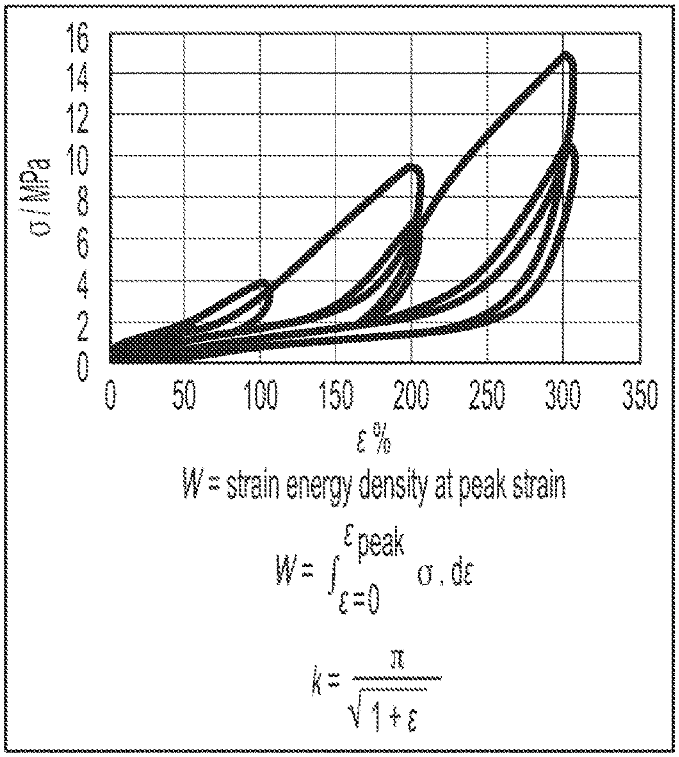
FIG. 14B shows additional tensile fatigue life data of an exemplary embodiment of the inventive carbon blacks in an elastomeric composition.
Figure 15:
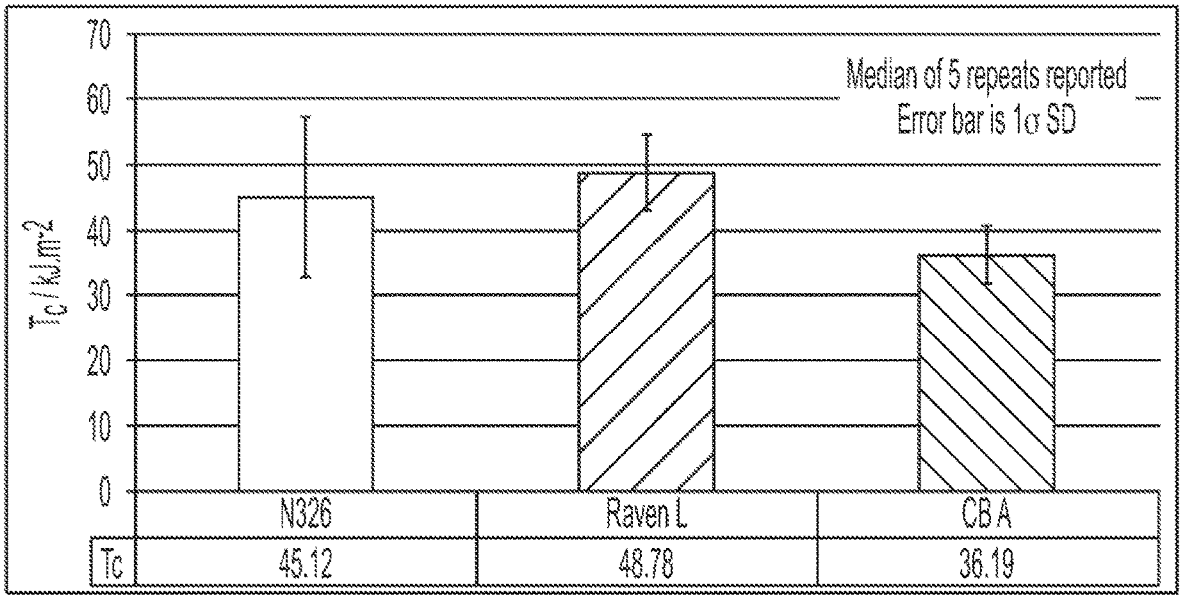
FIG. 15 shows Critical Tear Energy (Tc) of an exemplary embodiment of the inventive carbon blacks in an elastomeric composition, showing a 15-20% reduction in compound tan(delta) max versus the N326 control.

FIG. 2 shows IFM dispersion of an exemplary embodiment of the inventive carbon blacks in an elastomeric composition prepared according to the method parameters described in Tables 2-3, as compared to N326 grade and Raven L carbon blacks. FIG. 3 shows T5 Scorch properties of the same rubber composition. T90 Scorch properties of the same rubber composition are shown in FIG. 4. Mooney viscosity properties are shown in FIG. 5. Shore A Hardness values are shown in FIG. 6. Static moduli data are shown in FIG. 7. Tensile strength is shown in FIG. 8. Elongation at break properties are plotted in FIG. 9. Rebound % at 25° C. is shown in FIG. 10. Rebound % at 60° C. is shown in FIG. 11. ARES dynamic data for the rubber composition, containing the inventive carbon black, is shown in FIG. 12, showing a drop in the Payne Effect, consistent with the rebound data. ARES dynamic data for the rubber composition is plotted in FIG. 13, which shows a 15-20% reduction in compound tan(delta)max versus an N326 control. Tensile fatigue life for the rubber composition is shown in FIGS. 14A-B, demonstrating an increase in fatigue life relative to controls. Critical Tear Energy (Tc) for the rubber composition is shown in FIG. 15.

Compositional details of a rubber composition prepared according to Tables 2-3 is shown below in Table 4.

TABLE 4

| Component | Loading/phr |
|---|---|
| NR (SVR CV60) | 100 |
| Carbon Black | 60 |
| Sunpar 150 | 5 |
| Stearic Acid | 2 |
| Zinc Oxide | 4 |
| 6PPD | 2.5 |
| Penacolite B19S (RF resin) | 2 |
| Cyrez 964 (HMMM, 65%) | 4.63 |
| DCBS | 1.5 |
| Sulphur | 4 |

Mechanical and other properties for the composition described in Table 4 are listed below in Table 5.

TABLE 5

| Rubber Property | | N326 | CB A | ASTM Test Method Ref. |
|---|---|---|---|---|
| Dispersability | Pass 1 IFM Dispersion Index | 0 | 0 | D2663 method D[1] |
| | Pass 2 IFM Dispersion Index | 33 | 52 | |
| | Pass 3 IFM Dispersion Index | 64 | 77 | |
| | Pass 4 IFM Dispersion Index | 85 | 90 | |
| Mooney Viscosity | | 63 | 59 | D1646 |
| Shore A Hardness | | 77 | 74 | D2240 |
| Tensile | M100 | 5.22 MPa | 4.99 MPa | D412 |
| | M200 | 11.92 MPa | 11.83 MPa | |
| | M300 | 19.02 MPa | 18.83 MPa | |
| | Tensile Strength | 23.9 MPa | 24.1 MPa | |
| | Elongation | 381% | 392% | |
| Hysteresis Indicator (G" maximum) | | 1.20 MPa | 1.00 MPa | N/A[2] |
| | Tear | 49.1 J/m$^2$ | 66.4 J/m$^2$ | D624 CP[3] |
| Cord adhesion | Virgin | 280.3 N | 309.6 N | D2229[4] |
| | Aged | 62.6 N | 97.0 N | |
| Fatigue Life | 65% strain | 105.0 k.cycles | 150.0 k.cycles | D4432[5] |
| | 100% strain | 45.0 k.cycles | 67.8 k.cycles | |
| | 135% strain | 14.0 k.cycles | 17.6 k.cycles | |

[1]IFM dispersion index test performed on material mixed on an 80 liter Banbury internal mixer. Four mixing passes were performed: 3.5 minutes each, 1st pass @ 45 rpm, 2nd pass @ 35 rpm, 3rd pass @ 35 rpm, 4th pass @ 30 rpm. After each mixing pass 5 samples were taken from the stock and crosslinked by soaking overnight in a peroxide solution and subsequently compression molding sheets of material for IFM analysis. IFM dispersion index was collected on each of the 5 samples taken per mixing pass. Values reported are the numerical mean.

[2]G" values were collected using the following process: dynamic strain sweeps between 0.1% and 62.5% single strain amplitude at 10 Hz with zero mean strain were performed using an ARES G2 torsional rheometer at 60° C. Specimen geometries were cylinders measuring 8 mm diameter and ~2 mm thickness which were stamped from sheets of vulcanized compound and bonded to rheometer parallel plates using Loctite 480 adhesive. A slight compressive normal force of 100 g was applied to the cylinders during the test procedure. The strain sweep test was performed by pre-conditioning the specimen six times at the specified dynamic strain amplitude before collecting torque-time data. This process was repeated from low to high strain amplitudes. Tests were performed in duplicate and the numerical mean is reported.

[3]Tests were performed at 60° C.

[4]Ageing conditions were as follows: 100° C. for 2 weeks.

[5]Values reported are the Weibull characteristic life parameter determined from Weibull distribution fits to the fatigue life data for 12 specimens collected at each tensile strain amplitude. Room temperature testing.

Features and advantages of this disclosure are apparent from the detailed specification, and the claims cover all such features and advantages. Numerous variations will occur to those skilled in the art, and any variations equivalent to those described in this disclosure fall within the scope of this disclosure. Those skilled in the art will appreciate that the conception upon which this disclosure is based may be used as a basis for designing other methods and systems for carrying out the several purposes of this disclosure. As a result, the claims should not be considered as limited by the description or examples.

What is claimed is:

1. An elastomeric composition comprising:

a. an elastomer in an amount of 100 parts per hundred rubber (phr); and b. a carbon black in an amount ranging from 35 parts per hundred rubber (phr) to 75 parts per hundred rubber (phr);

wherein the carbon black has the following properties:

a nitrogen surface area (NSA) ranging from about 55 $m^2/g$ to about 59 $m^2/g$; a statistical thickness surface area (STSA) ranging from about 55 $m^2/g$ to about 59 $m^2/g$; an iodine absorption number ranging from about 62 mg/g to about 66 mg/g; an oil absorption number (OAN) ranging from about 73 cc/100 g to about 77 cc/100 g; a compressed oil absorption number (COAN) ranging from about 68 cc/100 g to about 73 cc/100 g; and a 325 mesh water wash residue of less than about 25 ppm.

2. The elastomeric composition of claim 1, wherein the elastomer comprises natural rubber (NR), polybutadiene rubber (BR), styrene butadiene rubber (SBR), synthetic polyisoprene rubber, butyl rubber, ethylene propylene rubber, or any blend or combination thereof.

3. The elastomeric composition of claim 1, wherein the composition exhibits an IFM dispersion index that is at least 5% higher than that exhibited by a substantially identical reference composition but with the carbon black replaced with ASTM N326 grade carbon black.

4. The elastomeric composition of claim 3, wherein the composition exhibits an IFM dispersion index that ranges from 5% higher to 60% higher than that exhibited by the substantially identical reference composition.

5. The elastomeric composition of claim 1, wherein the composition exhibits a tensile strength that differs less than 5% of a tensile strength exhibited by a substantially identical reference composition but with the carbon black replaced with ASTM N326 grade carbon black.

6. The elastomeric composition of claim 1, wherein the composition exhibits elongation at break that differs less than 5% of elongation at break exhibited by a substantially identical reference composition but with the carbon black replaced with ASTM N326 grade carbon black.

7. The elastomeric composition of claim 1, wherein the composition exhibits a hysteresis indicator value that is at least 10% less than a hysteresis indicator value exhibited by a substantially identical reference composition but with the carbon black replaced with ASTM N326 grade carbon black.

8. The elastomeric composition of claim 7, wherein the composition exhibits a hysteresis indicator value that is from 10% less to 20% less than a hysteresis indicator value exhibited by the substantially identical reference composition.

9. The elastomeric composition of claim 1, wherein the composition exhibits a tear strength value that is equal to or up to 40% greater than a tear strength value exhibited by a substantially identical reference composition but with the carbon black replaced with ASTM N326 grade carbon black.

10. The elastomeric composition of claim 1, wherein the composition exhibits a cord adhesion value that is equal to or up to 60% greater than a cord adhesion value exhibited by a substantially identical reference composition but with the carbon black replaced with ASTM N326 grade carbon black.

11. The elastomeric composition of claim 1, wherein the composition exhibits a fatigue life value that is equal to or up to 60% greater than a fatigue life value exhibited by a substantially identical reference composition but with the carbon black replaced with ASTM N326 grade carbon black.

12. An article comprising the elastomeric composition of claim 1.

* * * * *